US012669184B2

(12) United States Patent
Trinh et al.

(10) Patent No.: US 12,669,184 B2
(45) Date of Patent: Jun. 30, 2026

(54) SINGLE VALVED BYPASS METER BAR SYSTEM

(71) Applicants:Joe Trinh, Rosemead, CA (US); Brian Sararu, Hemet, CA (US); Michael Covington, San Clemente, CA (US)

(72) Inventors: Joe Trinh, Rosemead, CA (US); Brian Sararu, Hemet, CA (US); Michael Covington, San Clemente, CA (US)

( * ) Notice: Subject to any disclaimer, the term of this patent is extended or adjusted under 35 U.S.C. 154(b) by 86 days.

(21) Appl. No.: 18/588,001

(22) Filed: Feb. 27, 2024

(65) Prior Publication Data

US 2024/0288079 A1 Aug. 29, 2024

Related U.S. Application Data

(60) Provisional application No. 63/448,644, filed on Feb. 27, 2023.

(51) Int. Cl.
 *F16K 11/02* (2006.01)
 *F16K 11/085* (2006.01)
(52) U.S. Cl.
 CPC .......... *F16K 11/02* (2013.01); *F16K 11/0853* (2013.01)

(58) Field of Classification Search
 CPC .... F16K 11/02; F16K 11/0853; G01F 15/005; G01F 15/185; Y10T 137/0413; Y10T 137/5997; Y10T 137/86726
 See application file for complete search history.

(56) References Cited

U.S. PATENT DOCUMENTS

| | | | | |
|---|---|---|---|---|
| 3,238,969 | A * | 3/1966 | Champion | .......... F16K 11/0833 73/201 |
| 3,289,696 | A * | 12/1966 | Champion | ............ G01F 15/185 137/599.13 |
| 6,832,623 | B2 * | 12/2004 | Johnson | ................ G01F 15/005 73/201 |
| 7,152,621 | B1 * | 12/2006 | Huetinck | .............. G01F 15/185 70/180 |
| 7,347,219 | B2 * | 3/2008 | Gohde | .................... F16K 11/20 73/201 |
| 9,383,032 | B1 * | 7/2016 | Bhatasana | ........... G01M 3/2876 |

* cited by examiner

*Primary Examiner* — Michael R Reid
(74) *Attorney, Agent, or Firm* — John D. Tran; Rhema Law Group. P.C.

(57) ABSTRACT

A meter bar system and method can include: providing a body; and coupling a valve to the body, the valve configured to provide gas flow configurations based on a rotational position of the valve, the gas flow configurations including a normal gas flow configuration, a purge gas flow configuration, and a bypass gas flow configuration.

16 Claims, 9 Drawing Sheets

SINGLE VALVED BYPASS METER BAR SYSTEM

TECHNICAL FIELD

This disclosure relates to bypass meter bars for gas distribution, more particularly to a bypass meter bar having a single valve.

REFERENCE TO RELATED APPLICATIONS

This application claims earlier priority benefit to U.S. Provisional Application Ser. No. 63/448,644, filed on Feb. 27, 2023.

BACKGROUND OF THE INVENTION

Gas distribution systems include residential and commercial gas distribution and represent a vast resource distribution system with ever increasing demand and limited opportunity for product differentiation. As demand and competitive market pressures increase, there is a need to improve the efficiency and the productiveness when installing, replacing, or otherwise servicing gas meters.

Bypass meter bars are used for gas distribution systems and are coupled, directly or indirectly, to gas meters. Bypass meter bars provide various gas flows for an operator when servicing gas meters.

Previous bypass meter bars enabled the required gas flows but did so using multiple valves. These multiple valved bypass meter bars were complicated to use and required a synchronization of the valves during use, which demands large investments in training.

The multiple valved bypass meter bars also required more maintenance, which lead to larger investments in personnel hours performing maintenance together with larger investments in training personnel to perform maintenance. These multiple valved bypass meter bars also included many moving parts increasing production costs and points of failure.

Previous developments failed to provide the simple, cheap, intuitive bypass meter bar that could reduce these training, financial, and design burdens. Solutions have been long sought but prior developments have not taught or suggested any complete solutions, and solutions to these problems have long eluded those skilled in the art. Thus, there remains a considerable need for devices and methods that can provide a simple, easy to use, and cost effective bypass meter bar.

SUMMARY OF THE INVENTION

A single valved bypass meter bar system and methods of manufacturing, providing a simple, easy to use, and cost-effective bypass meter bar, are disclosed. The single valved bypass meter bar system, herein referred to as the meter bar system, can include: a body having an input connection port, an output connection port, a meter input connection port, and a meter output connection port; and a valve coupled to the body, the valve configured to provide gas flow configurations based on a rotational position of the valve, the gas flow configurations including: a normal gas flow configuration for allowing gas to flow from the input connection port through the valve and out of the meter input connection port and from the meter output connection port through the valve and through the output connection port, a purge gas flow configuration for allowing the gas to flow from the input connection port through the valve and through the output connection port, and allowing the gas to flow through the valve and the meter input connection port, and a bypass gas flow configuration for allowing the gas to flow from the input connection port through the valve and out of the output connection port.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The meter bar system is illustrated in the figures of the accompanying drawings which are meant to be exemplary and not limiting, in which like reference numerals are intended to refer to like components, and in which.

DETAILED DESCRIPTION

Figure 1:
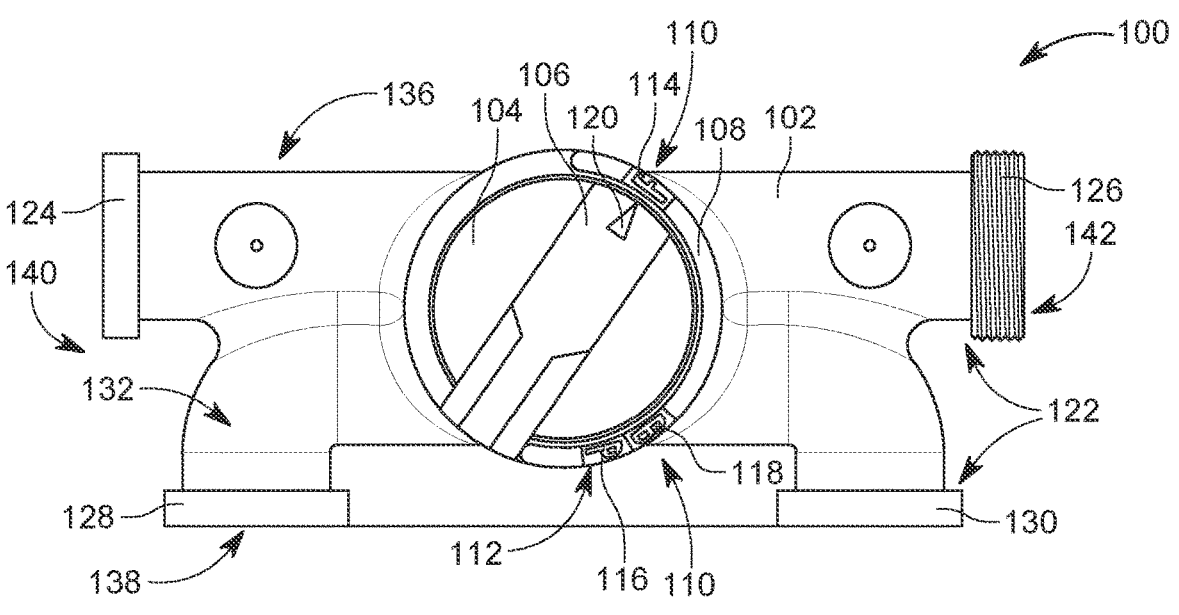
FIG. 1 is a front view of the meter bar system in a normal gas flow configuration.

In the following description, reference is made to the accompanying drawings that form a part hereof, and in which are shown by way of illustration, embodiments in which the meter bar system may be practiced. It is to be understood that other embodiments may be utilized and structural changes may be made without departing from the scope of the meter bar system.

When features, aspects, or embodiments of the meter bar system are described in terms of steps of a process, an operation, a control flow, or a flow chart, it is to be understood that the steps can be combined, performed in a different order, deleted, or include additional steps without departing from the meter bar system as described herein.

The meter bar system is described in sufficient detail to enable those skilled in the art to make and use the meter bar system and provide numerous specific details to give a thorough understanding of the meter bar system; however, it will be apparent that the meter bar system may be practiced without these specific details.

In order to avoid obscuring the meter bar system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs.

Referring now to FIG. 1, therein is shown a front view of the meter bar system 100 in a normal gas flow configuration. The meter bar system 100 is shown with a body 102 and a single valve 104.

The body 102 can be a metal body or other material suitable for use in gas infrastructure. The metal body can maintain the dimensions of pipes in common use. The single valve 104 can include a valve handle 106 eliminating the need to use tools when manipulating the rotational position of the single valve 104 of the meter bar system 100.

The single valve 104 can be fitted within the body 102. The body 102 can further include a safety shroud 108 having lock out locations 110, which are shown more clearly for example in FIG. 7.

As shown the safety shroud 108 can include valve location indicators 112 on an edge facing away from the body 102. The location indicators 112 can indicate a normal flow location 114, a purge flow location 116, and a bypass flow location 118.

The valve handle 106 can be rotated between the normal flow location 114, the purge flow location 116, and the bypass flow location 118. The location indicators 112 can also be located at other locations on the body 102.

The lock out locations 110 can be placed at any of the location indicators 112. As depicted, for example in FIG. 9 below, which shows the lock out locations 110 at the normal flow location 114 and the bypass flow location 118.

The valve handle 106 is shown with marking indicator 120 pointing at the normal flow location 114. The safety shroud 108 can extend only partially around the single valve 104. It is contemplated that one portion of the valve handle 106 can be left exposed from the safety shroud 108 in order to ensure the ability to manipulate the valve handle 106 either with a firm grip or with tools.

That is, the partial safety shroud 108 allows the valve handle 106 to be gripped more tightly or by tools. The body 102 can include connection ports 122.

The connection ports 122 can be multi-size and configurable to any size gas line used. The connection ports 122 can include an input connection port 124. The input connection port 124 can be connected to a gas line from a utility providing the gas.

Typically, the input connection port 124 is connected to a gas line down stream of a gas regulator (not shown). The input connection port 124 can be threaded internally as shown in FIG. 2 below.

The connection ports 122 can further include an output connection port 126. The output connection port 126 can be connected to a gas line running to a consumer. The output connection port 126 is threaded externally.

The connection ports 122 can still further include meter connection ports, which can be connected to a gas meter (not shown). The meter connection ports are shown below the input connection port 124 and the output connection port 126 and can include a meter input connection port 128, which provides gas to an input of a meter and a can include a meter output connection port 130, which receives gas from an output of a meter.

Figure 2:
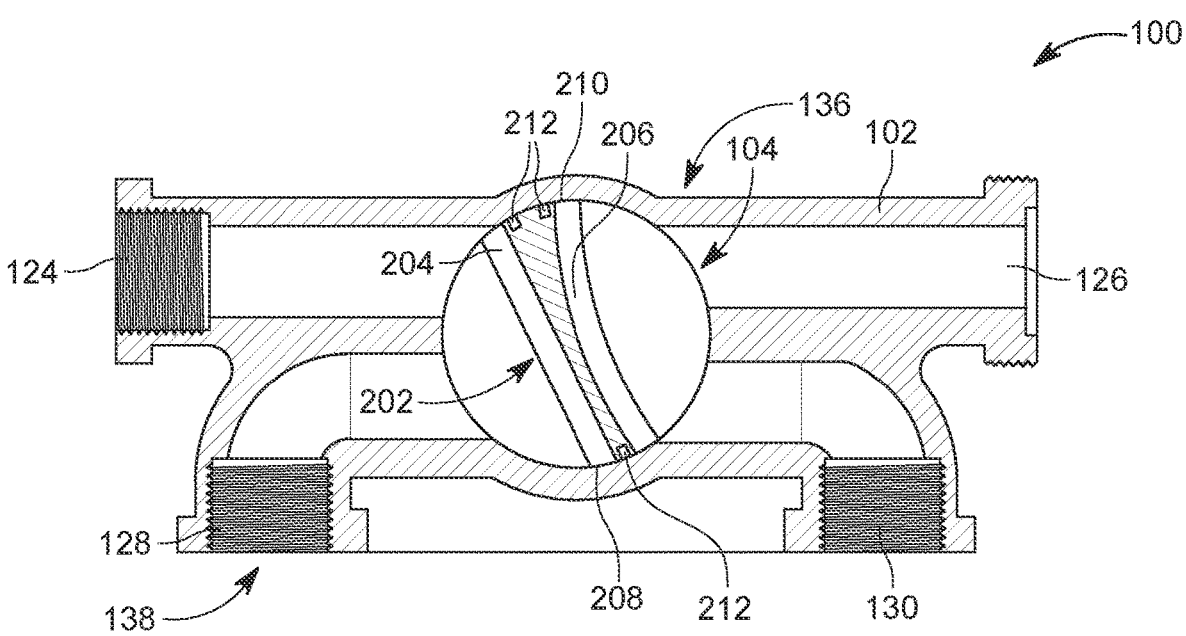
FIG. 2 is a cross-sectional view of the meter bar system in the normal gas flow configuration of FIG. 1.
Figure 8:
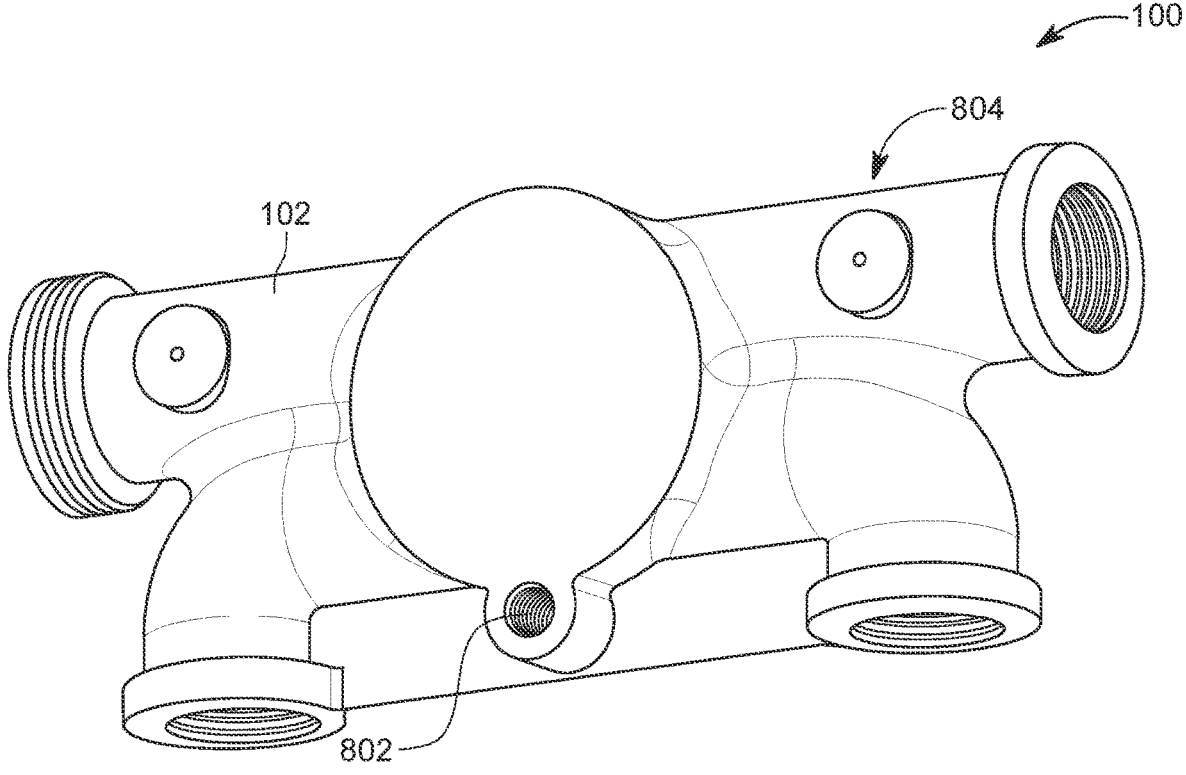
FIG. 8 is a back view of the meter bar system.

The meter input connection port 128 and the meter output connection port 130 can be threaded internally as shown in FIG. 2 below. Generally, when describing the meter bar system 100, areas of the meter bar system 100 are referred to as a front side 132, a back side 804 as shown in FIG. 8, a top side 136, a bottom side 138, a left side 140 and a right side 142. The left side 140 and the right side 142 being left and right in relation to the front side 132.

The single valve 104 has been shown to solve the problems associated with disrupting natural gas flow to a customer during service of a gas meter. The problem is solved by redirecting the gas flow through the meter bar system 100 so as to not interrupt the gas flow and gas service to the customer while maintenance is performed to the gas meter.

The advantages of the meter bar system 100 is its simplicity, lower maintenance, fewer moving parts, removing the need to synchronize left and right operations of valves, and much more cost effective. This is achieved through usage of the single valve 104 over the need for multiple valves in other previous systems.

Referring now to FIG. 2, therein is shown a cross-sectional view of the meter bar system 100 in the normal gas flow configuration of FIG. 1. The meter bar system 100 is shown having the input connection port 124, the meter input connection port 128, and the meter output connection port 130 threaded internally.

The single valve 104 is shown with an internal valve structure 202. The internal valve structure 202 can include a straight side 204, a curved side 206, a narrow end 208 and a thick end 210.

The straight side 204 can be opposite the curved side 206. On one end of the internal valve structure 202 the straight side 204 and the curved side 206 can converge to form the narrow end 208. On the other side of the internal valve structure 202, the straight side 204 and the curved side 206 can diverge to form the thick end 210.

That is, the curved side 206 can be close to the straight side 204 near the narrow end 208 and extend in a curve away from the straight side 204 near the thick end 210. The internal valve structure 202 is shown including seals 212 in the narrow end 208 and in the thick end 210.

More particularly, the thick end 210 is shown having two of the seals 212 while the narrow end 208 is shown only having one of the seals 212. As shown, the internal valve structure 202 in the normal flow location 114 of FIG. 1 can allow gas to flow from the input connection port 124 through the single valve 104 into the meter input connection port 128.

The normal gas flow configuration includes the two seals 212 of the thick end 210 in direct contact with the body 102 near the top side 136 while seal 212 on the narrow end 208 is in direct contact with the body 102 near the bottom side 138. Simultaneously, the internal valve structure 202 in the normal flow location 114 can allow gas to flow from the meter output connection port 130, through the internal valve structure 202, and out of the output connection port 126.

Figure 3:
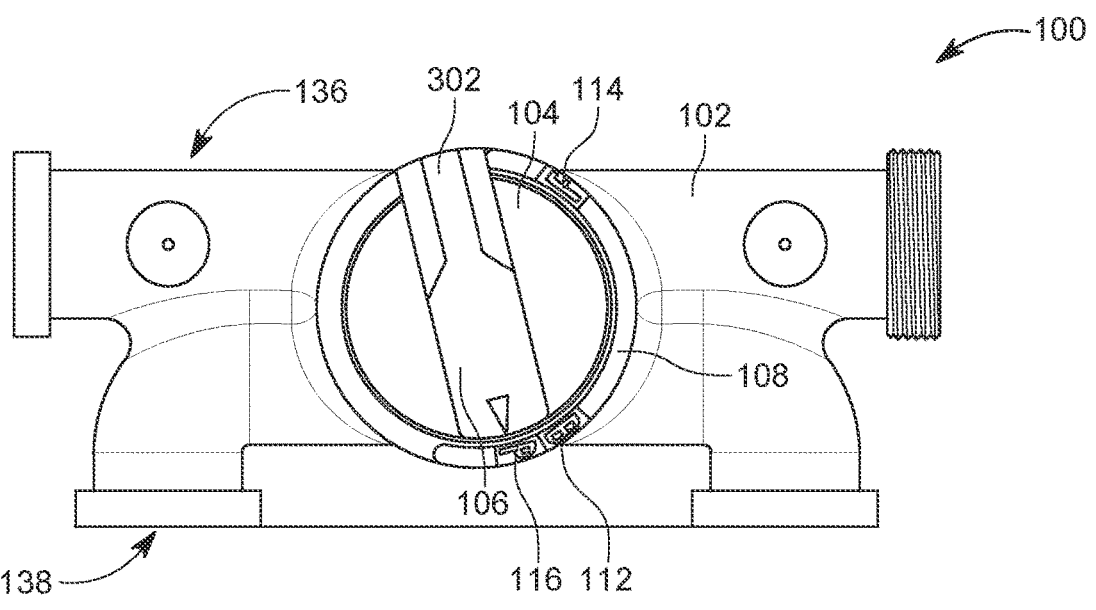
FIG. 3 is a front view of the meter bar system in a purge gas flow configuration.

Referring now to FIG. 3, therein is shown a front view of the meter bar system 100 in a purge gas flow configuration. The meter bar system 100 is shown with the body 102 with the single valve 104 rotated from the normal gas flow configuration of FIGS. 1 and 2. The normal gas flow configuration was depicted with the single valve 104 in a first direction while the purge gas flow configuration is depicted with the single valve 104 fully rotated from the first direction.

Figure 5:
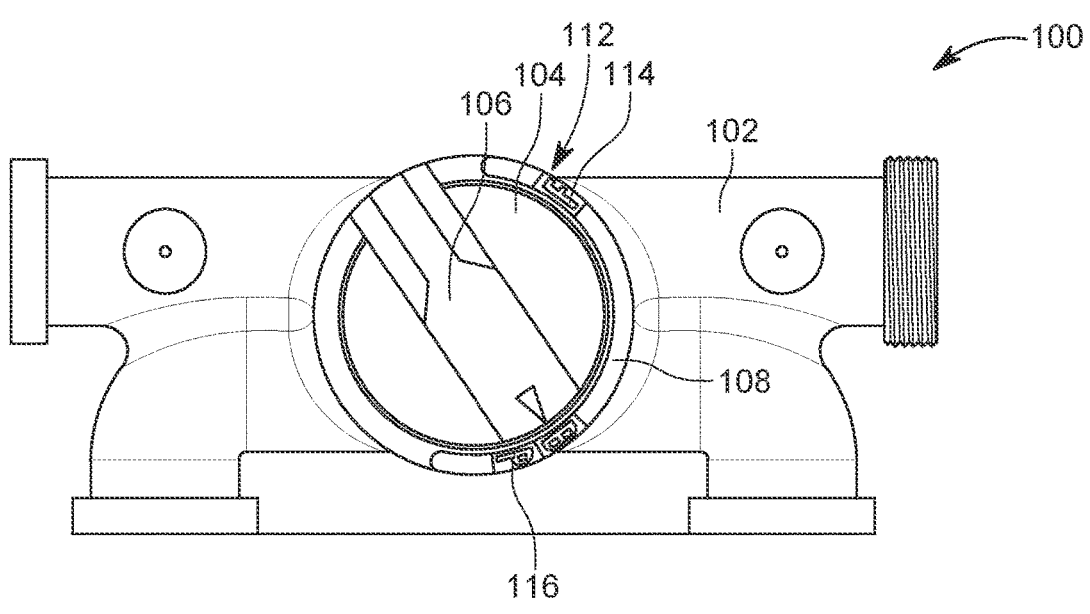
FIG. 5 is a front view of the meter bar system in a bypass gas flow configuration.
Figure 6:
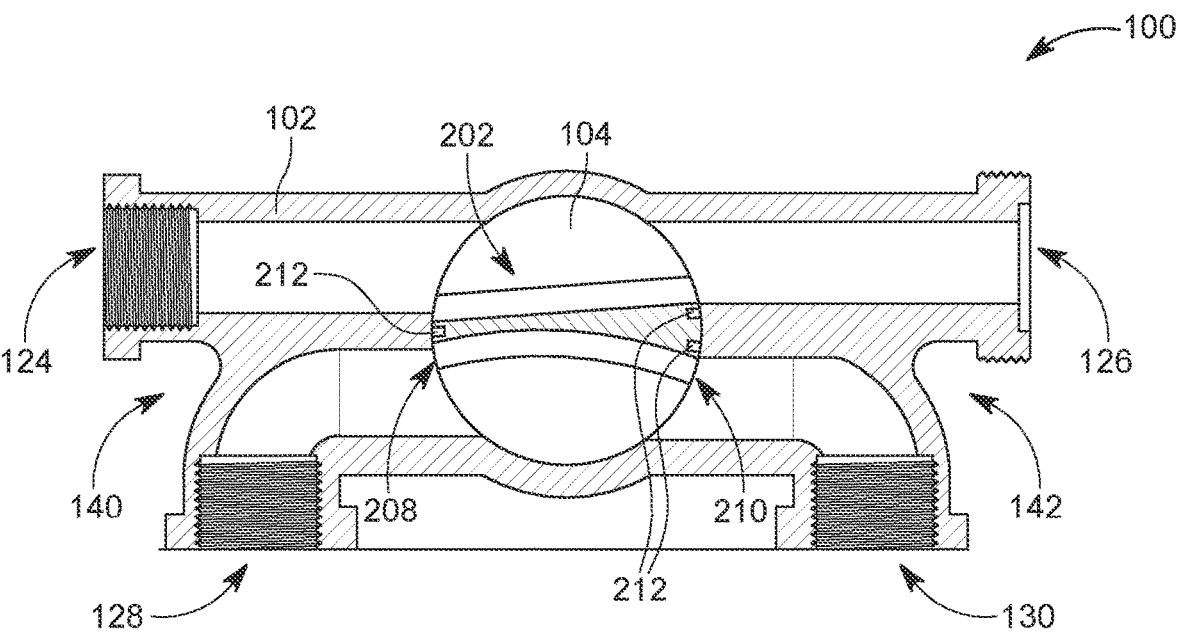
FIG. 6 is a cross-sectional view of the meter bar system in the bypass gas flow configuration of FIG. 5.

The full rotation of the single valve 104 is shown as less than 180 degrees, or less than half a turn to fully rotate the single valve 104. Furthermore, the bypass gas flow configuration of FIGS. 5 and 6 is achieved with the single valve 104 rotated between the positions of the normal gas flow configuration and the purge gas flow configuration.

Furthermore, when the single valve 104 is rotated to either the normal flow location 114 or the purge flow location 116, the valve handle 106 can be in direct contact with the safety shroud 108 and can provide a direct mechanical stop for the single valve 104. This can be seen for example in FIG. 1 with a tail end 302 of the valve handle 106 in direct contact with the safety shroud 108 near the bottom side 138 and in FIG. 3 with the tail end 302 of the valve handle 106 in direct contact with the safety shroud 108 near the top side 136 since the valve is at a limit of its rotational position. The tail end 302 of the valve handle 106 can overhang the body 102.

This is further shown by the location indicators 112 on the safety shroud 108. The safety shroud 108 can extend from the body 102 towards a front surface of the valve handle 106 and can shroud and protect the valve handle 106 in the entire rotational arc from the normal flow location 114 to the purge flow location 116.

Figure 4:
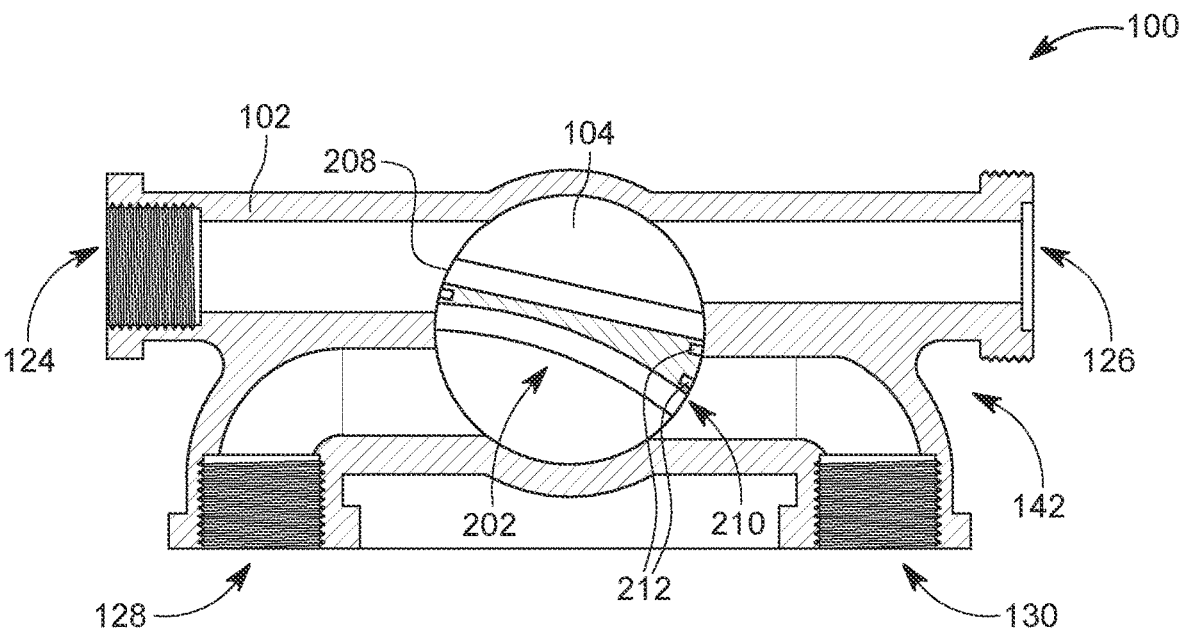
FIG. 4 is a cross-sectional view of the meter bar system in the purge gas flow configuration of FIG. 3.

Referring now to FIG. 4, therein is shown a cross-sectional view of the meter bar system 100 in the purge gas flow configuration of FIG. 3. The single valve 104 is shown with the internal valve structure 202 in the purge flow location 116 of FIG. 3 and can allow gas to flow from the input connection port 124 through the single valve 104 out of the output connection port 126 and simultaneously from the input connection port 124 into the meter input connection port 128.

The purge gas flow configuration includes one of the two seals 212 of the thick end 210 in direct contact with the body 102 near the right side 142 while the other of the two seals of the thick end 210 is exposed within the meter output connection port 130. The seal 212 on the narrow end 208 is exposed within the input connection port 124.

Referring now to FIG. 5, therein is shown a front view of the meter bar system 100 in a bypass gas flow configuration. The meter bar system 100 is shown with the body 102 with the single valve 104 rotated between the positions of the normal gas flow configuration of FIGS. 1 and 2, and the purge gas flow configuration of FIGS. 3 and 4.

This is further shown by the location indicators 112 on the safety shroud 108. The safety shroud 108 can extend from the body 102 towards a front surface of the valve handle 106 and can shroud and protect the valve handle 106 in the entire rotational arc from the normal flow location 114 to the purge flow location 116.

Referring now to FIG. 6, therein is shown a cross-sectional view of the meter bar system 100 in the bypass gas flow configuration of FIG. 5. The single valve 104 is shown with the internal valve structure 202 in the bypass flow location 118 of FIG. 5 and can allow gas to flow from the input connection port 124 through the single valve 104 out of the output connection port 126. Gas can but does not flow through the meter input connection port 128 and the meter output connection port 130.

The seals 212 are therefore shown and described in multiple configurations including: 1) the normal gas flow configuration with the two seals 212 of the thick end 210 in direct contact with the body 102 near the top side 136 while seal 212 on the narrow end 208 is in direct contact with the body 102 near the bottom side 138 of FIG. 2; 2) the purge gas flow configuration with one of the two seals 212 of the thick end 210 in direct contact with the body 102 near the right side 142 while the other of the two seals of the thick end 210 is exposed within the meter output connection port 130 and the seal 212 on the narrow end 208 is exposed within the input connection port 124 of FIGS. 4; and 3) the bypass gas flow configuration with the two seals 212 of the thick end 210 in direct contact with the body 102 near the right side 142. The seal 212 on the narrow end 208 is in direct contact with the body 102 near the left side 140. The seals 212 contact a different portion of the body based on the valve in the normal gas flow configuration, the purge gas flow configuration, or the bypass gas flow configuration.

Figure 7:
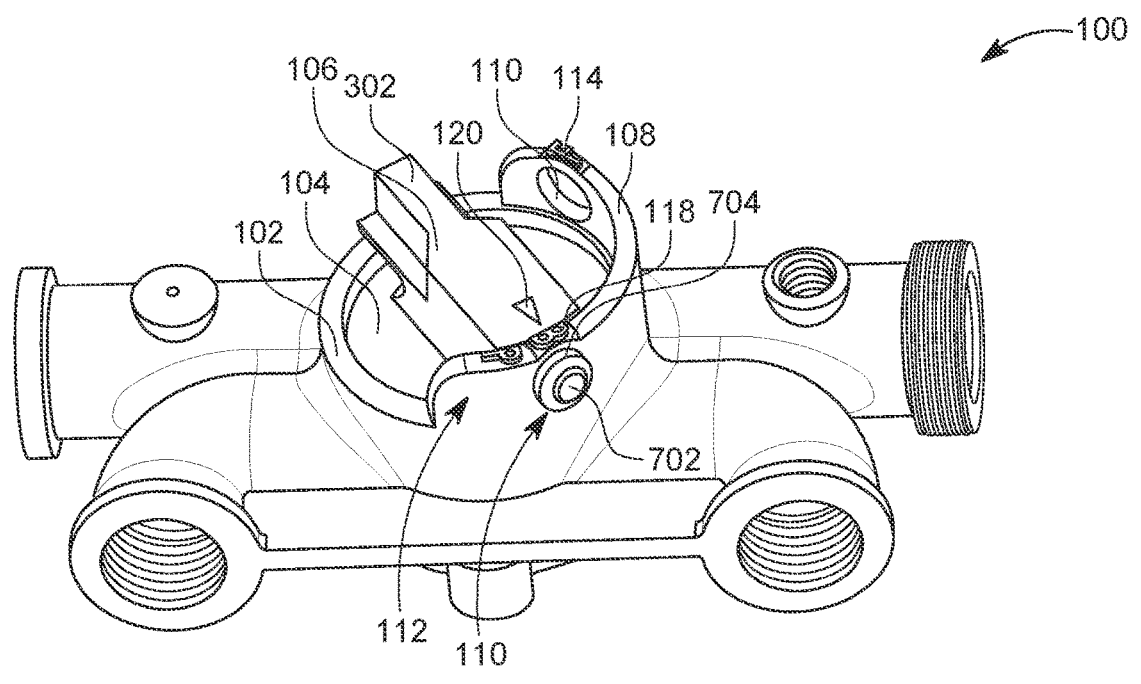
FIG. 7 is a bottom isometric view of the meter bar system in the bypass gas flow configuration of FIG. 5.

Referring now to FIG. 7, therein is shown a bottom isometric view of the meter bar system 100 in the bypass gas flow configuration of FIG. 5. The bypass flow location 118 includes the lock out locations 110 at the bypass flow location 118 and the normal flow location 114.

As the meter bar system 100 is in the bypass gas flow configuration, the valve handle 106 of the single valve 104 is in the bypass flow location 118. The lock out location 110 at the bypass flow location 118 is shown to include a lockout plug 702. It is contemplated that the single valve 104 is lockable and openable by authorized personnel.

The lockout plug 702 can extend through the safety shroud 108 and into the valve handle 106 in order to lock the rotation of the single valve 104. The lockout plug 702 can include a flared end 704 that can be in contact with the safety shroud 108 and provide something to pry or grip when the meter bar system 100 needs to be unlocked.

The valve handle 106 is shown having a raised arrow as the marking indicator 120 pointing toward the location indicators 112 for the gas flow configuration selected. The tail end 302 of the handle is shown overhanging the body 102 around the single valve 104.

Referring now to FIG. 8, therein is shown a back view of the meter bar system 100. The meter bar system 100 is depicted with the body 102 having an accessory mount 802. This accessory mount 802 can allow accessories (not shown) to be coupled to a back side 804 of the body 102 of the meter bar system 100.

Figure 9:
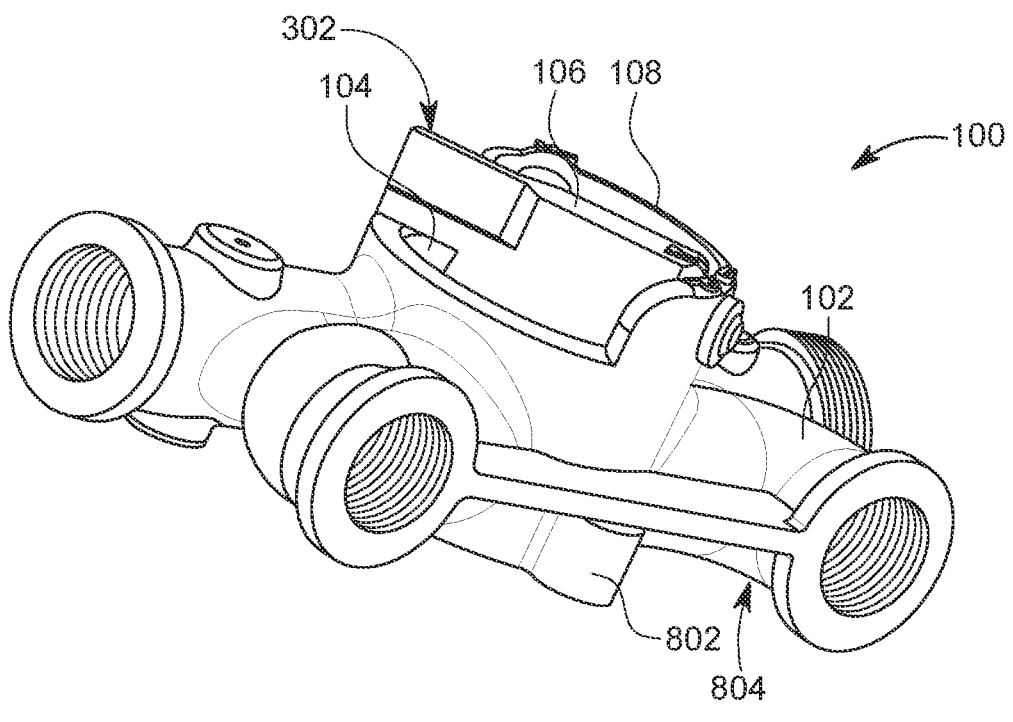
FIG. 9 is a bottom-right isometric view of the meter bar system in the bypass gas flow configuration of FIG. 5.

Referring now to FIG. 9, therein is shown a bottom-right isometric view of the meter bar system 100 in the bypass gas flow configuration of FIG. 5. The meter bar system 100 is shown having the accessory mount 802 on the back side 804 of the body 102. Furthermore, the meter bar system 100 is shown with the single valve 104 having the valve handle 106 surrounded by the safety shroud 108 and the tail end 302 of the valve handle 106 overhanging the body 102.

Figure 10:
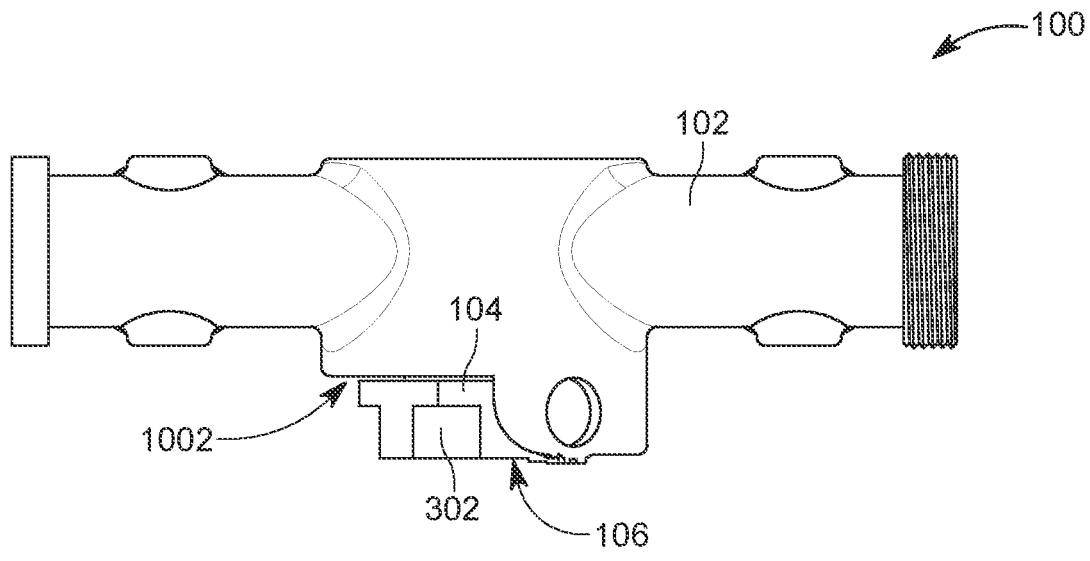
FIG. 10 is a top view of the meter bar system in the bypass gas flow configuration of FIG. 5.

Referring now to FIG. 10, therein is shown a top view of the meter bar system 100 in the bypass gas flow configuration of FIG. 5. The valve handle 106 of the single valve 104 is shown having a space 1002 between the tail end 302 and the body 102.

Figure 11:
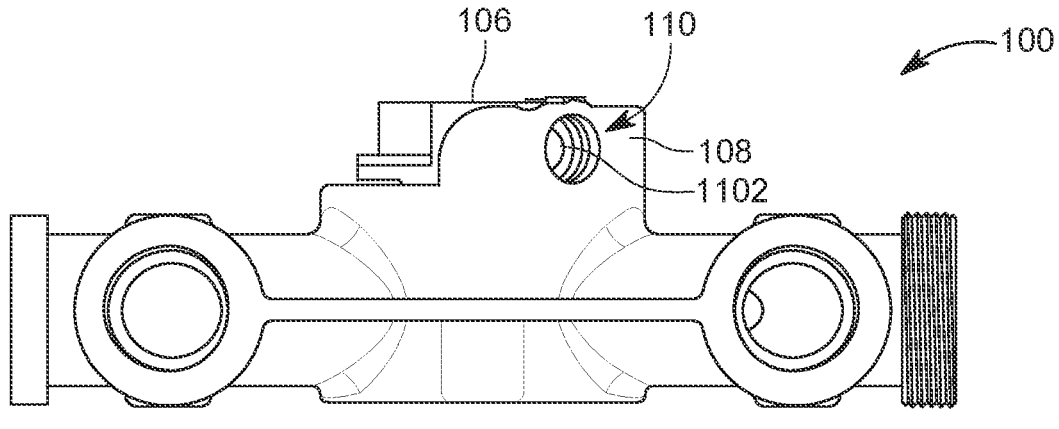
FIG. 11 is a bottom view of the meter bar system in the bypass gas flow configuration of FIG. 5.

Referring now to FIG. 11, therein is shown a bottom view of the meter bar system 100 in the bypass gas flow configuration of FIG. 5. The valve handle 106 is depicted with a lockout hole 1102 corresponding to the lock out locations 110 on the safety shroud 108. The alignment of the lockout hole 1102 and the lock out location 110 enables the single valve 104 to be locked out as shown in FIGS. 7 and 9 for example.

Figure 12:
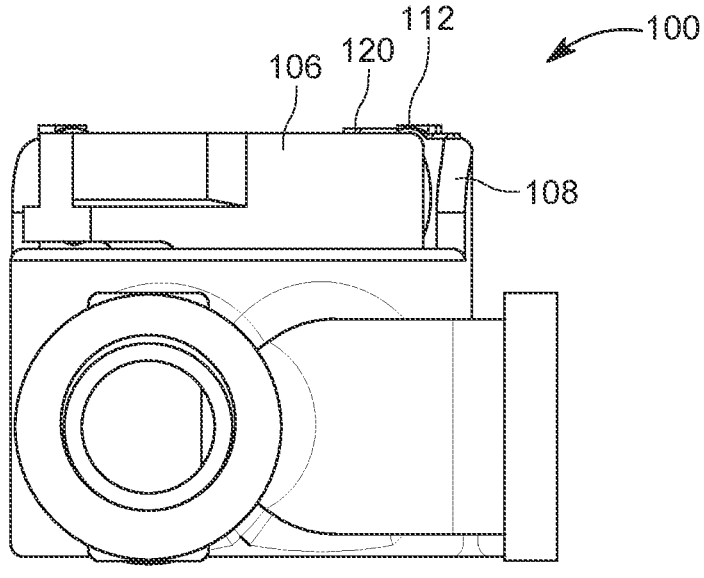
FIG. 12 is a left side view of the meter bar system in the bypass gas flow configuration of FIG. 5.

Referring now to FIG. 12, therein is shown a left side view of the meter bar system 100 in the bypass gas flow configuration of FIG. 5. The valve handle 106 is shown having the raised arrow as the marking indicator 120 extending up therefrom. Furthermore, the safety shroud 108 is shown with the location indicators 112 in raised font extending therefrom.

Figure 13:
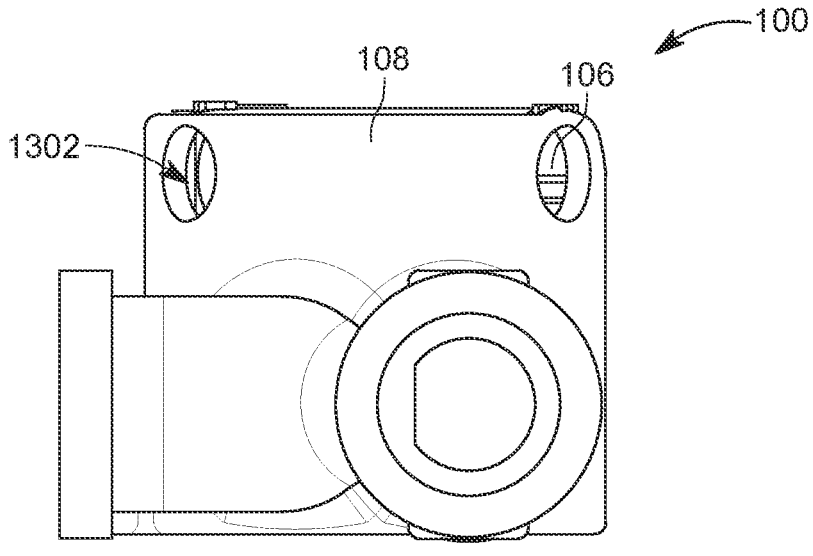
FIG. 13 is a right side view of the meter bar system in the bypass gas flow configuration of FIG. 5.

Referring now to FIG. 13, therein is shown a right side view of the meter bar system 100 in the bypass gas flow configuration of FIG. 5. The meter bar system 100 is shown with a gap 1302 between the valve handle 106 and the safety shroud 108.

Figure 14:
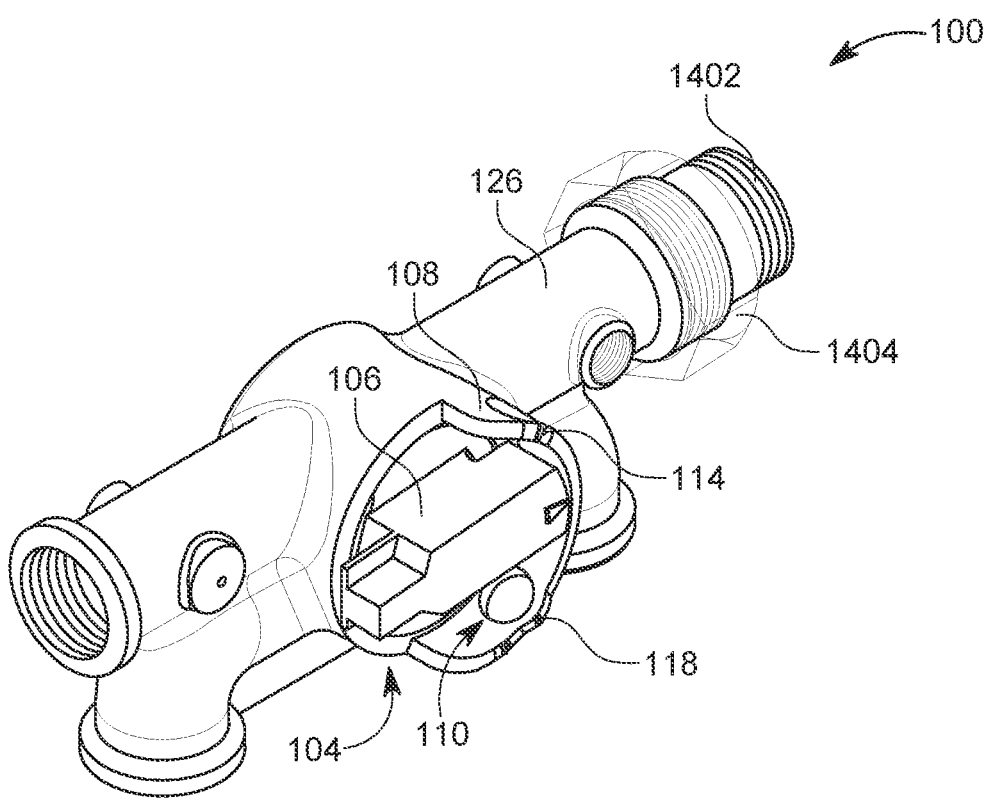
FIG. 14 is a left isometric view of the meter bar system in an in between configuration.

Referring now to FIG. 14, therein is shown a left isometric view of the meter bar system 100 in an in between configuration. The single valve 104 of the meter bar system 100 is shown in the process of being turned either to the normal flow location 114 or the bypass flow location 118. The safety shroud 108 around the lock out locations 110 is shown extended out in a curve away from the lock out locations 110 in order to ensure that the lockout plug 702 of FIG. 7 is not able to be torn or forced through the safety shroud 108 and the safety shroud 108 is thick enough to ensure the lockout plug 702 is secure.

It will be appreciated that the valve handle 106 is configured to be thin enough to allow a good grip with space for a tool or gloved hands to grip the valve handle 106 between the valve handle 106 and the safety shroud 108. The output connection port 126 is shown connected to a gas pipe 1402 with a nut 1404.

Figure 15:
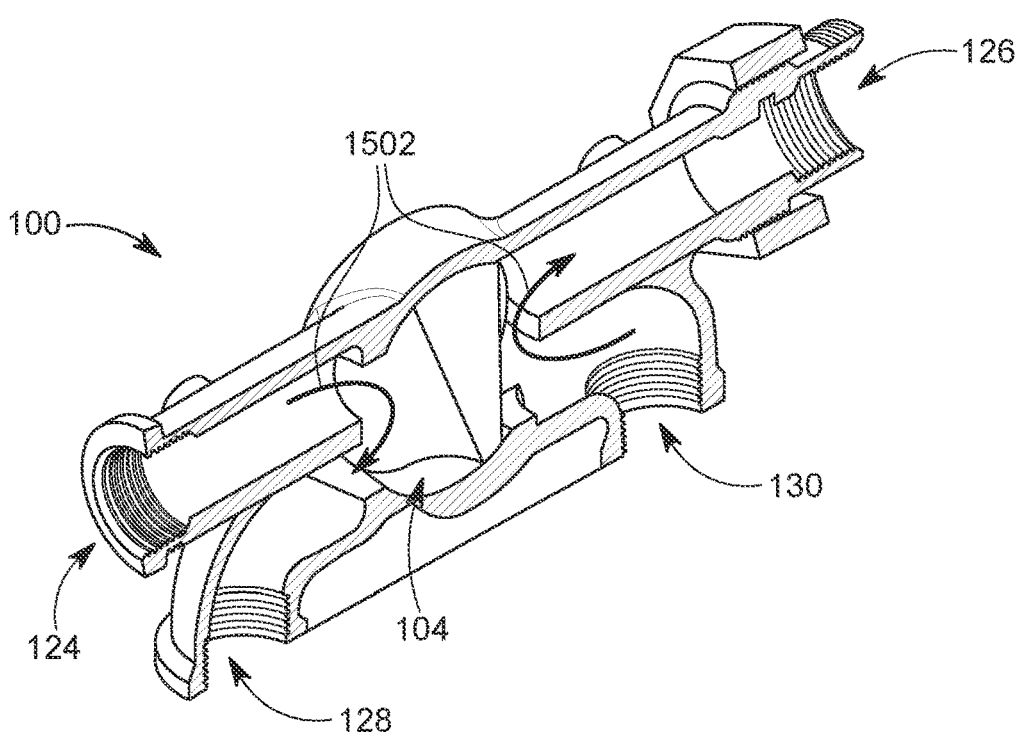
FIG. 15 is a left isometric cross-sectional view of the meter bar system in the normal gas flow configuration of FIG. 1.

Referring now to FIG. 15, therein is shown a left isometric cross-sectional view of the meter bar system 100 in the normal gas flow configuration of FIG. 1. In the normal gas flow configuration, gas 1502 is shown flowing from the input connection port 124 through the single valve 104 and out of the meter input connection port 128. The gas 1502 is further shown flowing from the meter output connection port 130 through the single valve 104 and out of the output connection port 126.

Figure 16:
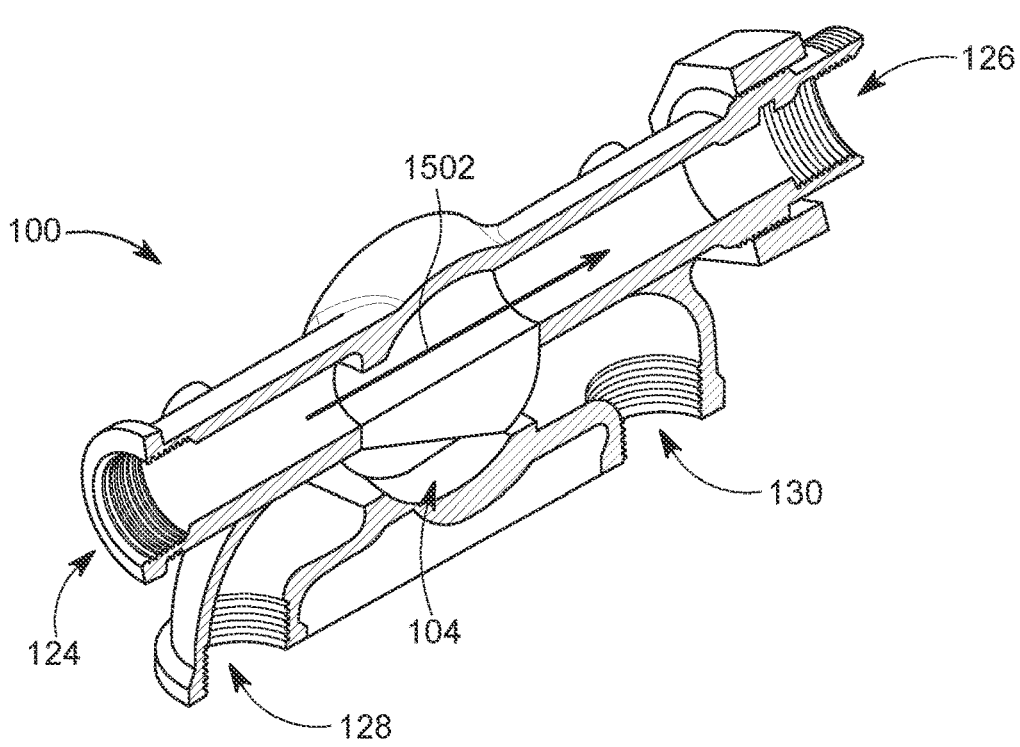
FIG. 16 is a left isometric cross-sectional view of the meter bar system in the bypass gas flow configuration of FIG. 5.

Referring now to FIG. 16, therein is shown a left isometric cross-sectional view of the meter bar system 100 in the bypass gas flow configuration of FIG. 5. In the bypass gas flow configuration, the gas 1502 is shown flowing from the input connection port 124 through the single valve 104 and out of the output connection port 126. The meter output connection port 130 and the meter input connection port 128 are not connected to gas flow.

Figure 17:
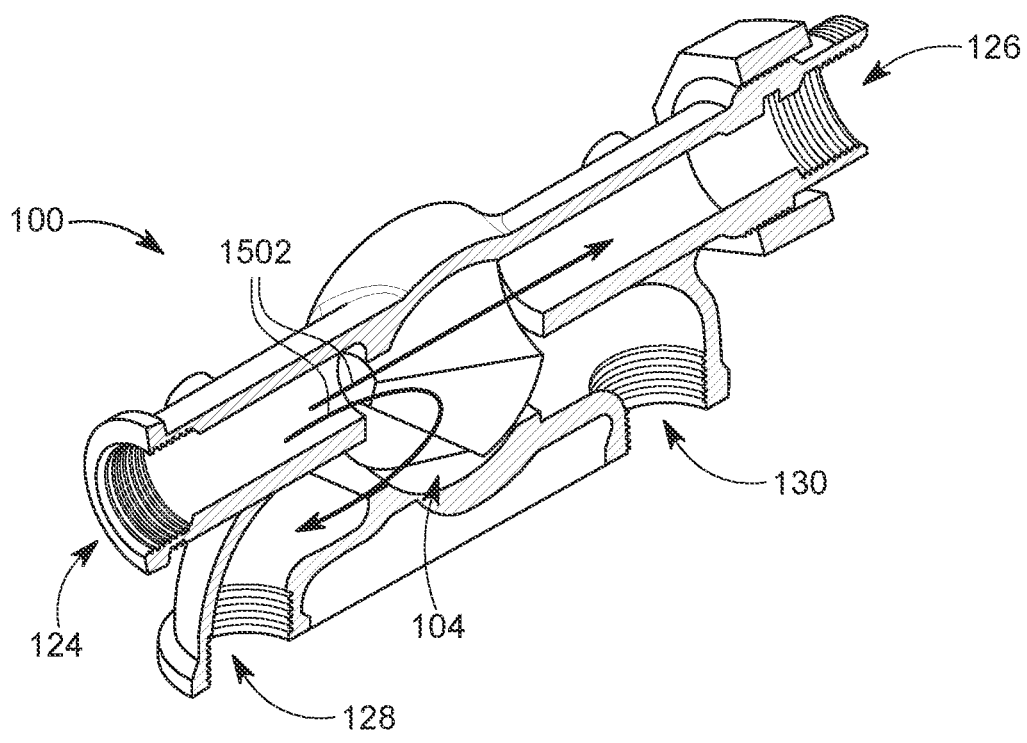
FIG. 17 is a left isometric cross-sectional view of the meter bar system in the purge gas flow configuration of FIG. 3.

Referring now to FIG. 17, therein is shown a left isometric cross-sectional view of the meter bar system 100 in the purge gas flow configuration of FIG. 3. In the purge gas flow configuration, the gas 1502 is shown flowing from the input connection port 124 through the single valve 104 and out of the output connection port 126. Simultaneously, the gas 1502 is shown flowing from the input connection port 124 through the single valve 104 and out of the meter input connection port 128. The meter output connection port 130 is not shown flowing the gas 1502.

Figure 18:
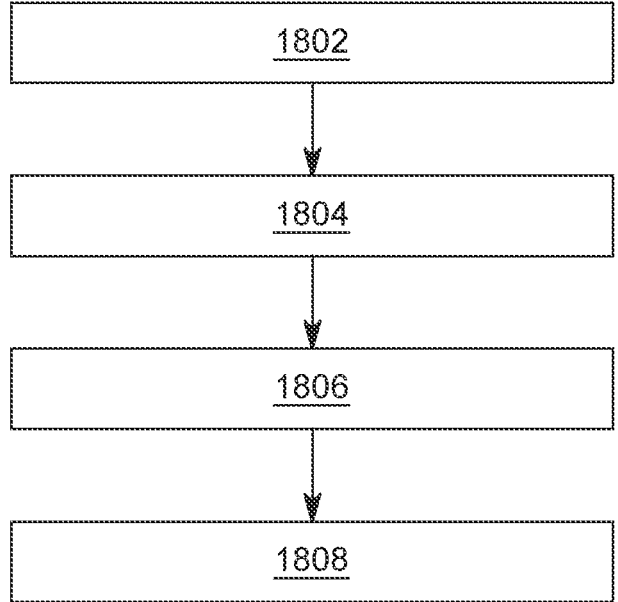
FIG. 18 is a control flow for manufacturing the meter bar system of FIG. 1.

Referring now to FIG. 18, therein is shown a control flow for manufacturing the meter bar system 100 of FIG. 1. The control flow can include providing a body having an input connection port, an output connection port, a meter input connection port, and a meter output connection port in a block 1802; coupling a valve to the body, the valve configured to provide gas flow configurations based on a rotational position of the valve, the gas flow configurations including: a normal gas flow configuration for allowing gas to flow from the input connection port through the valve and out of the meter input connection port and from the meter output connection port through the valve and through the output connection port, a purge gas flow configuration for allowing the gas to flow from the input connection port through the valve and through the output connection port, and allowing the gas to flow through the valve and the meter input connection port, and a bypass gas flow configuration for allowing the gas to flow from the input connection port through the valve and out of the output connection port in a block 1804; the meter bar system can be coupled to a meter in a block 1806; and the meter bar system can be coupled to a utility gas line in a block 1808.

Thus, it has been discovered that the meter bar system provides a simple, easy to use, and cost effective bypass meter bar with a lower part count. The meter bar system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

Accordingly, it has been discovered that the single valve 104 of the meter bar system 100 provides uninterrupted gas flow to customers during gas meter maintenance, that is novel, unique and non-obvious. Furthermore, the meter bar system 100 provides the advantages of lower maintenance, is simple to install and remove, removes the need to synchronize left and right valve operations, and avoids the inconvenience and troubles which arise from the disruption of a customer's natural gas flow due to gas meter maintenance. All of which results in improved customer satisfaction at a reduced cost and part count that results in increased the rate of employability and use in the field.

While the meter bar system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A meter bar system comprising:
   a body having an input connection port, an output connection port, a meter input connection port, and a meter output connection port, the body further including a safety shroud; and
   a valve coupled to the body, the valve configured to provide gas flow configurations based on a rotational position of the valve, the valve includes a lockout hole for fixing the valve in the rotational position, the gas flow configurations including:
      a normal gas flow configuration for allowing gas to flow from the input connection port through the valve and out of the meter input connection port and from the meter output connection port through the valve and through the output connection port,
      a purge gas flow configuration for allowing the gas to flow from the input connection port through the valve and through the output connection port, and allowing the gas to flow through the valve and the meter input connection port, and

US 12,669,184 B2

9 a bypass gas flow configuration for allowing the gas to flow from the input connection port through the valve and out of the output connection port.

2. The system of claim 1 wherein: the valve includes an internal valve structure with a straight side opposite a curved side, the straight side and the curved side converge to form a narrow end.

3. The system of claim 1 wherein: the valve includes an internal valve structure with a straight side opposite a curved side, the straight side and the curved side diverge to form a thick end.

4. The system of claim 1 wherein: the valve includes an internal valve structure with seals on two opposing ends.

5. The system of claim 1 wherein: the valve includes a valve handle for changing the rotational position of the valve.

6. The system of claim 1 wherein: the safety shroud includes location indicators indicating the rotational position of the valve in the normal gas flow configuration, the purge gas flow configuration, and the bypass gas flow configuration.

7. The system of claim 1 wherein: the safety shroud includes a lock out location for fixing the valve in the rotational position.

8. The system of claim 1 wherein: the valve includes a handle configured to contact the safety shroud at a limit of the rotational position of the valve.

9. A method of manufacturing a meter bar system comprising:

providing a body having an input connection port, an output connection port, a meter input connection port, and a meter output connection port, the body further including a safety shroud; and coupling a valve to the body, the valve configured to provide gas flow configurations based on a rotational position of the valve, the valve includes a lockout hole for fixing the valve in the rotational position, the gas flow configurations including:

a normal gas flow configuration for allowing gas to flow from the input connection port through the valve and out of the meter input connection port and from the meter output connection port through the valve and through the output connection port, a purge gas flow configuration for allowing the gas to flow from the input connection port through the valve and through the output connection port, and allowing the gas to flow through the valve and the meter input connection port, and a bypass gas flow configuration for allowing the gas to flow from the input connection port through the valve and out of the output connection port.

10. The method of claim 9 wherein: coupling the valve includes coupling the valve having an internal valve structure with a straight side opposite a curved side, the straight side and the curved side converge to form a narrow end.

11. The method of claim 9 wherein: coupling the valve includes coupling the valve having an internal valve structure with a straight side opposite a curved side, the straight side and the curved side diverge to form a thick end.

12. The method of claim 9 wherein: coupling the valve includes coupling the valve having an internal valve structure with seals on two opposing ends.

13. The method of claim 9 wherein: coupling the valve includes coupling the valve having a valve handle for changing the rotational position of the valve.

14. The method of claim 9 wherein: providing the body includes providing the body with the safety shroud having location indicators indicating the rotational position of the valve in the normal gas flow configuration, the purge gas flow configuration, and the bypass gas flow configuration.

15. The method of claim 9 wherein: providing the body includes providing the body with the safety shroud having a lock out location for fixing the valve in the rotational position.

16. The method of claim 9 wherein: coupling the valve includes coupling the valve having a handle configured to contact the safety shroud at a limit of the rotational position of the valve.

* * * * *